(12) United States Patent
Suzuki (10) Patent No.: US 8,646,213 B2
(45) Date of Patent: Feb. 11, 2014

(54) GLASS RUN FOR MOTOR VEHICLE

(71) Applicant: Toyoda Gosei Co., Ltd., Kiyosu (JP)

(72) Inventor: Hisayuki Suzuki, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/658,653

(22) Filed: Oct. 23, 2012

(65) Prior Publication Data

US 2013/0111821 A1    May 9, 2013

(30) Foreign Application Priority Data

Nov. 4, 2011   (JP) .................................. 2011-242211

(51) Int. Cl.
*E06B 7/16* (2006.01)

(52) U.S. Cl.
USPC ........................................................ 49/479.1

(58) Field of Classification Search
USPC ........ 49/475.1, 440, 441, 495.1, 479.1, 489.1
See application file for complete search history.

(56) References Cited

U.S. PATENT DOCUMENTS

| | | | | |
|---|---|---|---|---|
| 6,598,348 | B2* | 7/2003 | Palicki ........................ | 49/479.1 |
| 6,725,605 | B2* | 4/2004 | Schlachter et al. .......... | 49/479.1 |
| 8,104,229 | B2* | 1/2012 | Minami et al. ............... | 49/479.1 |
| 8,256,163 | B2* | 9/2012 | Eguchi et al. ................ | 49/479.1 |
| 2001/0001917 | A1* | 5/2001 | Goto ............................. | 49/440 |
| 2002/0062596 | A1* | 5/2002 | Palicki ........................ | 49/441 |
| 2002/0139054 | A1* | 10/2002 | Schlachter et al. .......... | 49/479.1 |
| 2008/0265615 | A1 | 10/2008 | Eguchi et al. | |
| 2009/0108625 | A1 | 4/2009 | Minami et al. | |
| 2010/0126077 | A1 | 5/2010 | Eguchi et al. | |

FOREIGN PATENT DOCUMENTS

| | | |
|---|---|---|
| JP | 2006-327415 A | 12/2006 |
| JP | 2007-331528 A | 12/2007 |
| JP | 2008-239138 A | 10/2008 |
| JP | 2008-265634 A | 11/2008 |
| JP | 2009-107485 A | 5/2009 |
| JP | 2009-234395 A | 10/2009 |
| JP | 2009-234396 A | 10/2009 |

* cited by examiner

*Primary Examiner* — Jerry Redman (74) *Attorney, Agent, or Firm* — McGinn IP Law Group, PLLC (57) ABSTRACT

A glass run capable of being readily attached to corner parts of a door frame of a door of a motor vehicle such that an end edge of a corner cover of the glass run can be securely engaged with an end of a corner piece. A corner cover adapted to cover a vehicle-exterior surface of the corner piece like an arcuate configuration is formed in a corner section of the glass run. An arcuate end edge of the corner cover defines a corner cover lip for contacting an end of the corner piece, and a corner cover engaging wall is formed in the corner cover so as to protrude inwardly from a vehicle-interior surface of the corner cover lip. The corner cover engaging wall and the corner cover lip define an engaging groove, and a plurality of corner cover inclination ribs are formed so as to respectively have an inclined surface connecting the corner cover engaging wall and the vehicle-interior surface of the corner cover lip.

11 Claims, 6 Drawing Sheets

GLASS RUN FOR MOTOR VEHICLE

CROSS-REFERENCE TO RELATED APPLICATION

This application is related to and claims priority from Japanese patent Application No. 2011-242211 incorporated herein by reference.

BACKGROUND OF THE INVENTION

1. Field of the Invention

The present invention relates to a glass run for use in a motor vehicle, which is adapted to be attached to an inner periphery of a door frame of the motor vehicle to guide a door glass as it is raised and lowered.

2. Description of Related Art

Figure 1:
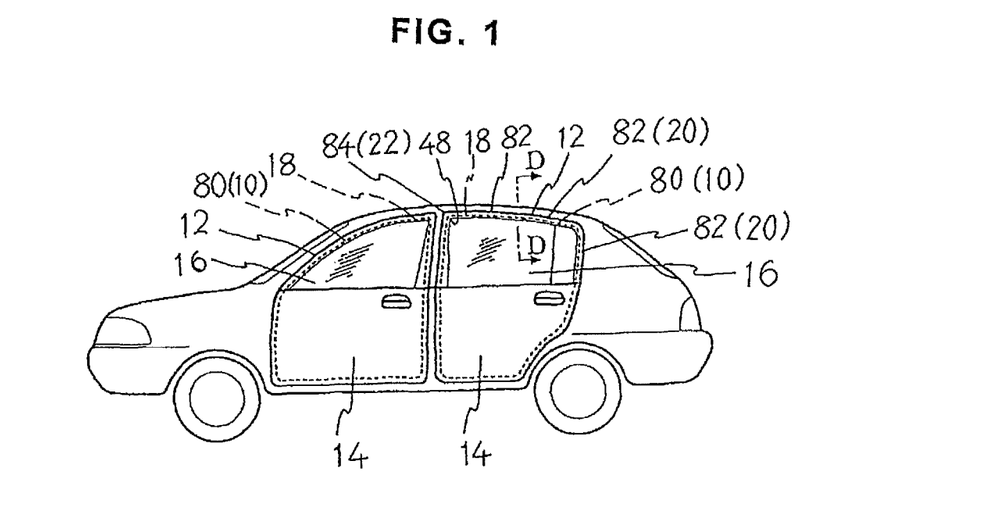
FIG. 1 is a side view of a motor vehicle.
Figure 2:
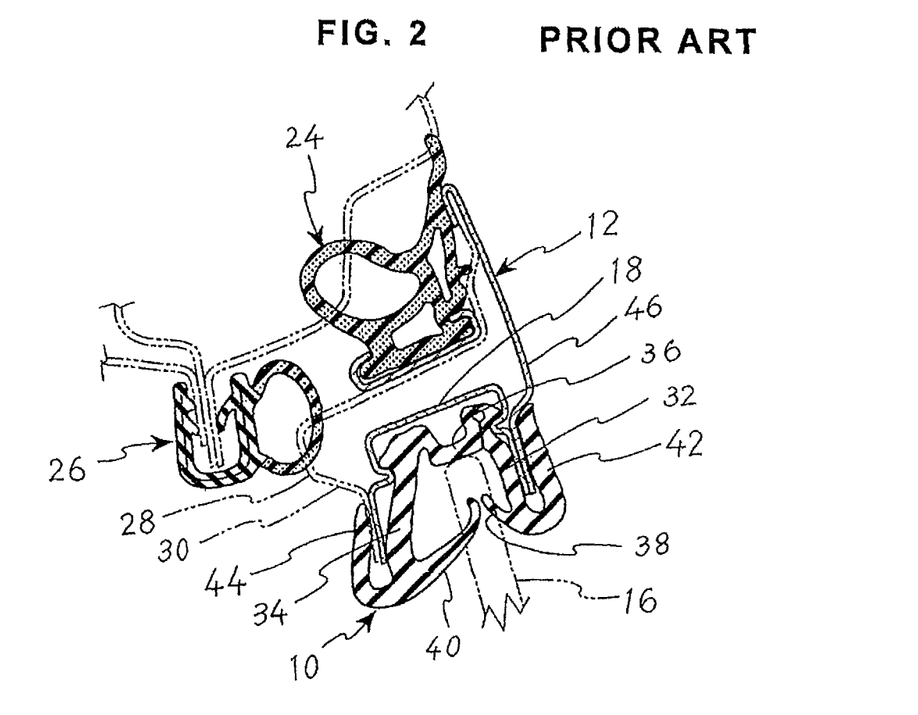
FIG. 2 is a view showing a conventional attaching relationship of weather strips to a door frame.
Figure 3:
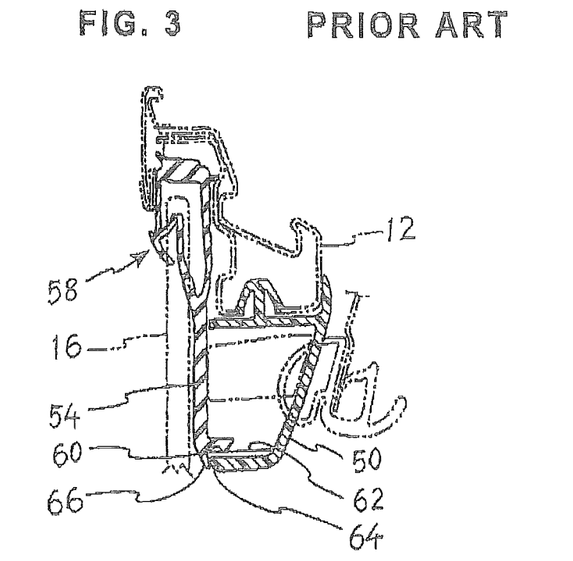
FIG. 3 is a cross-sectional view of a corner section of a conventional glass run.
Figure 4:
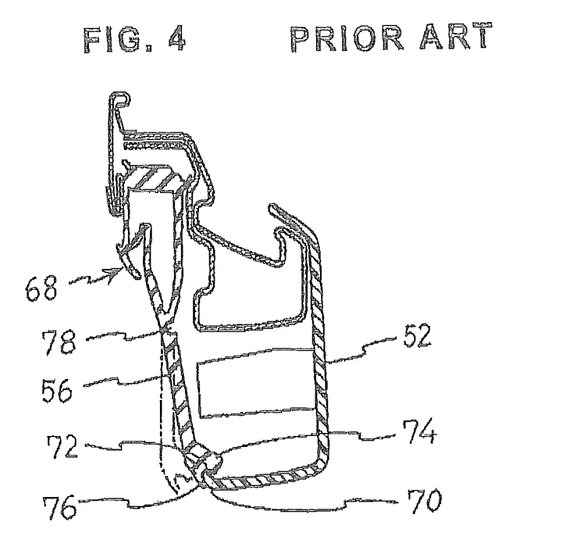
FIG. 4 is a cross-sectional view of a corner section of another conventional glass run.

As shown in FIG. 1, a glass run 10 is attached to an inner periphery of a door frame 12 of a vehicle door 14 for guiding a door glass 16 as it is raised and lowered. FIGS. 2 through 4 show a conventional attaching structure of the glass run 10. FIG. 2 is a cross-sectional view taken along line D-D of FIG. 1 and showing the attaching relationship between the glass run 10 and weather strips.

As shown in FIG. 2, conventionally, the glass run 10 is fitted in a channel 18 of the door frame 12 to guide the door glass 16 upwardly and downwardly within a door glass opening provided along the inner periphery of the door frame 12, and effect a seal between the door glass 16 and the door frame 12. As shown in FIG. 1, the glass run 10 is generally formed by joining extruded straight sections 20 adapted to be attached along an upper side portion, a front vertical side portion and a rear vertical side portion of the door frame 12 with corner sections 22, each being formed by molding in conformity with the configuration of the door frame 12.

A door weather strip 24 is attached to an outer periphery of the door frame 12, and an opening trim weather strip 26 is attached to a flange provided in a door opening portion of a vehicle body, thereby sealing between the vehicle door 14 and the vehicle body. When the vehicle door 14 is closed, a tubular portion of the opening trim weather strip 26 contacts and seals a vehicle-interior surface of a protrusion 28 provided in an inner panel 30 defining the door frame 12.

As shown in FIG. 2, the glass run 10 includes an outer side wall 32, an inner side wall 34 and a bottom wall 36, and has a generally U-shaped cross-section. An outer seal lip 38 is provided to extend from an open end of the outer side wall 32 towards an interior space of the glass run 10. And an inner seal lip 40 is provided to extend from an open end of the inner side wall 34 towards the interior space of the glass run 10. In addition, an outer cover lip 42 is provided to extend from the open end of the outer side wall 32 along a vehicle-exterior surface thereof towards the bottom wall 36, and an inner cover lip 44 is provided to extend from the open end of the inner side wall 34 along a vehicle-interior surface thereof towards the bottom wall 36. In some examples, the outer cover lip 42 and the inner cover lip 44 are made short according to the configuration of the door frame 12.

The outer side wall 32, the inner side wall 34 and the bottom wall 36 are inserted in the channel 18 provided in the door frame 12, and exterior surfaces of these walls contact interior surfaces of the channel 18. An outer panel 46 of the door frame 12 and one side edge of the channel 18 are inserted between the outer side wall 32 and the outer cover lip 42, whereas the inner panel 30 and the other side edge of the channel 18 are inserted between the inner side wall 34 and the inner cover lip 44, thereby holding the glass run 10.

And, as shown in FIG. 1, in a corner part of the door 14, the upper side portion and the vertical side portion of the door frame 12 abut on, and are joined to each other. And an upper side portion and a vertical side portion of the channel are joined to each other, similarly. A resultant corner part 48 of the door frame 12 is formed at an acute angle, and consequently, the corner section 22 of the glass run 10 is molded at an acute angle in conformity with the configuration of the channel 18 of the door frame 12.

The vehicle body is provided by welding a plurality of panels defining the vehicle body so that the radius of curvature of a corner part of the door opening portion of the vehicle body, which is adapted to face the door frame 12 when the vehicle door 14 is closed, is great as compared with that of the corner part 48 of the door frame 12.

Therefore, as shown in FIGS. 3 and 4, arcuate corner pieces 50 and 52 are attached so as to cover the corner part 48 of the door frame 12, thereby making the radius of curvature of the corner part 48 of the door frame 12 approximately equal to that of the door opening portion of the vehicle body.

And corner covers 54 and 56 are provided in the corner section 22 of the glass run 10 so as to cover the corner pieces 50 and 52.

In a glass run 58 of FIG. 3, the corner piece 50 is attached to the corner part 48 of the door frame 12, and a projecting end of a pressing part 60 provided in a rear surface of the corner cover 54 is pressed on a rib 62 provided in a rear surface of an end portion 64 of the corner piece 50 thus attached, and consequently, a corner cover lip 66 covers the end portion 64 of the corner piece 50 without peeling therefrom (see Japanese patent application laid-open No. 2009-234395, for example).

However, where the glass run 58 is attached after attaching the corner piece 50 to the corner part 48 of the door frame 12, there occurs the problem that the corner cover lip 66 and the pressing part 60 contact the end portion 64 of the corner piece 50, and are caught thereby. As a result, it becomes difficult to attach the glass run 58 to the door frame 12.

In addition, there occurs the problem that, as the length of the corner cover 54 increases, the rigidity thereof lowers so that an end of the corner cover lip 66 is caught by the end portion 64 of the corner piece 50, thereby causing the deformation of the corner cover 54.

Furthermore, in a glass run 68 of FIG. 4, the corner piece 52 is attached to the corner part 48 of the door frame 12, and a hook-shaped bending part 70 provided along an end edge of the corner piece 52 is held in a recess defined with a holding part 74 and a lip 76, which are provided along an end edge of the corner cover 56 of the glass run 68 (see Japanese patent application laid-open No. 2009-107485, for example).

However, where the glass run 68 is attached after attaching the corner piece 52 to the door frame 12, similarly to the case of the glass run 58, there occurs the problem that the holding part 74 and the lip 76 strike against the hook-shaped bending part 70 of the corner piece 52. As a result, the corner cover 56 bends along a bending recess 78 so that it becomes difficult to attach the glass run 68 to the door frame 12.

SUMMARY OF THE INVENTION

It is an object of the present invention to provide a glass run capable of being readily attached to a corner part of a door frame of a vehicle door even when a corner piece is attached prior to the glass run, and capable of securely engaging an end of a corner cover of the glass run with an end of the corner piece.

In order to achieve the above-described object, according to a first aspect of the present invention, a glass run for use in a motor vehicle, which is adapted to be attached along an inner periphery of a door frame of a vehicle door for guiding a door glass as it is raised and lowered, and includes straight sections formed by extrusion, and corner sections formed by molding for contacting corner pieces attached to corner parts of the door frame, has:

an outer side wall, an inner side wall and a bottom wall, which define a generally U-shaped cross-section, an outer seal lip and an inner seal lip respectively projecting from open ends of the outer side wall and the inner side wall in an interior space defined with the walls having a generally U-shaped cross-section, thereby sealing exterior and interior surfaces of an end edge of the door glass.

A corner cover is provided in the corner section so as to extend from the open end of the inner side wall in an extending direction thereof for covering a vehicle-exterior surface of the corner piece in an arcuate configuration. An arcuate end edge of the corner cover defines a corner cover lip for contacting an end of the corner piece, a corner cover engaging wall protrudes inwardly from a vehicle-interior surface of the corner cover lip to define an engaging groove with an end of the corner cover lip and a surface of the corner cover engaging wall, which faces the end of the corner cover lip, and a plurality of corner cover inclination ribs are provided so as to respectively have an inclined surface connecting a protruding end of the corner cover engaging wall and the vehicle-interior surface of the corner cover lip at a root thereof.

With the arrangement according to the first aspect, the glass run has an outer side wall, an inner side wall and a bottom wall, which define a generally U-shaped cross-section. And an outer seal lip and an inner seal lip respectively project from open ends of the outer side wall and the inner side wall in an interior space defined with the walls having a generally U-shaped cross-section to seal vehicle-exterior and vehicle-interior surfaces of an end edge of the door glass.

Therefore, when the vehicle door is closed, an end of the door glass can be accommodated in the interior space of the glass run having the outer side wall, the inner side wall and the bottom wall to define a generally U-shaped cross-section, whereby the door glass can be securely held. And when the door glass is raised and lowered, the outer seal lip and the inner seal lip contact the door glass to seal between the door frame and the door glass.

A corner cover is provided in the corner section of the glass run so as to extend from the open end of the inner side wall in an extending direction thereof for covering a vehicle-exterior surface of the corner piece in an arcuate configuration. Therefore, the corner piece and the corner part of the door frame can be covered with a main body of the glass run and the corner cover, whereby the sealing properties and the appearance of the corner part of the door frame can be improved.

The arcuate end edge of the corner cover defines a corner cover lip for contacting an end of the corner piece, and a corner cover engaging wall is formed in a vehicle-interior surface of the corner cover lip so as to protrude inwardly therefrom, thereby defining an engaging groove with the corner cover lip and the corner cover engaging wall. With this arrangement, the end of the corner piece is engaged in the engaging groove of the corner cover so that the end edge of the corner cover can be prevented from coming off the corner piece.

A plurality of corner cover inclination ribs are provided so as to respectively have an inclined surface connecting a protruding end of the corner cover engaging wall and the vehicle-interior surface of the corner cover lip at a root thereof. With this arrangement, when the glass run is attached to the door frame after attaching the corner piece to the door frame, the end of the corner piece can slide on the inclined surface of the corner cover inclination ribs, and consequently, the end of the corner cover is prevented from being caught with the end of the corner piece, thereby ensuring the smooth attachment of the glass run.

According to a second aspect of the present invention, the glass run further includes a corner cover holding rib for connecting the corner cover inclination ribs in approximately parallel with the corner cover engaging wall at a root of the corner cover lip.

With the arrangement of the second aspect of the present invention, there is provided a corner cover holding rib for connecting the corner cover inclination ribs in approximately parallel with the corner cover engaging wall at a root of the corner cover lip. Therefore, the corner cover holding rib can prevent the tilting of the corner cover inclination ribs so that the end of the corner piece can smoothly slide on the inclined surfaces of the corner cover inclination ribs.

According to a third aspect of the present invention, the arcuate end edge of the corner cover lip of the corner cover approximately abut on an arcuate end edge of the corner piece attached to the corner part of the door frame, and a corner piece engaging projection provided along the end edge of the corner piece is engaged in the engaging groove of the corner cover when the glass run and the corner piece are attached to the door frame.

With the arrangement of the third aspect of the present invention, the arcuate end edge of the corner cover lip of the corner cover approximately abut on an arcuate end edge of the corner piece attached to the corner part of the door frame when the glass run and the corner piece are attached to the door frame. Therefore, in the corner part of the door frame, the corner piece inclusive of the arcuate end edge thereof can be covered with the corner cover, thereby improving the appearance therearound.

Since the end edges of the corner cover and the corner piece abut on each other, and the corner piece engaging projection provided along the end edge of the corner piece is engaged in the engaging groove of the corner cover, the end edge of the corner cover can be securely engaged.

According to a fourth aspect of the present invention, the glass run further includes a corner cover engaging projection projecting from the protruding end of the corner cover engaging wall towards an end of the corner cover lip such that the corner cover engaging projection, the corner cover engaging wall and the vehicle-interior surface of the corner cover lip define the corner cover engaging groove.

With the arrangement of the fourth aspect of the present invention, the corner cover engaging projection is formed so as to project from the protruding end of the corner cover engaging wall towards the end of the corner cover lip, thereby defining the corner cover engaging groove with the corner cover engaging projection, the corner cover engaging wall and the vehicle-interior surface of the corner cover lip. Therefore, the corner cover engaging groove can be formed to have a U-shaped cross-section so that the corner piece engaging projection can be accommodated in the corner cover engaging groove in conformity with the configuration of the corner piece engaging projection, whereby the end edge of the corner cover can be securely held.

According to a fifth aspect of the present invention, the corner cover engaging wall and the plurality of corner cover inclination ribs are provided in a rear corner part of the door frame of a front door of the motor vehicle, and a front corner part of a rear door of the motor vehicle.

With the arrangement of the fifth aspect of the present invention, the corner cover engaging wall and the plurality of corner cover inclination ribs are provided in a rear corner part of the door frame of a front door of the motor vehicle, and a front corner part of a rear door of the motor vehicle. Therefore, even where the corner part of the door frame bends at an acute-angle, the corner part can be securely covered with the corner piece and the corner cover of the glass run, thereby improving the appearance therearound.

According to a sixth aspect of the present invention, the glass run further includes a corner cover protrusion provided in the vehicle-interior surface of the corner cover so as to be adapted to contact the door frame.

With the arrangement of the sixth aspect of the present invention, the corner cover protrusion is formed in the vehicle-interior surface of the corner cover so as to be adapted to contact the door frame. Therefore, a gap between the door frame and the corner cover can be closed to prevent the vibration of the corner cover.

According to a seventh aspect of the present invention, the glass run further includes a door frame protrusion provided in the vehicle-interior surface of the inner side wall so as to be adapted to contact the door frame.

With the arrangement of the seventh aspect of the present invention, the door frame protrusion is formed in the vehicle-interior surface of the inner side wall so as to be adapted to contact the door frame. Therefore, when the door glass shifts inwardly, the glass run can be prevented from excessively shifting inwardly within a channel of the door frame.

According to an eighth aspect of the present invention, the glass run further includes a door glass protrusion provided in a surface of the inner side wall, which faces the outer side wall so as to contact the door glass.

With the arrangement of the eighth aspect of the present invention, the door glass protrusion is formed in a surface of the inner side wall, which faces the outer side wall so as to contact the door glass. Therefore, when the door glass shifts inwardly, the door glass can be prevented from excessively shifting inwardly, thereby ensuring the sealing properties, and from closely contacting the inner side wall, thereby preventing the increment of the sliding resistance as well as the generation of noises.

According to a ninth aspect of the present invention, embossment is formed on vehicle-exterior surfaces of the inner seal lip and the corner cover, and vehicle-exterior surfaces of the outer cover lip projecting from an end of the outer side wall.

With the arrangement of the ninth aspect of the present invention, embossment is formed on the vehicle-exterior surfaces of the inner seal lip and the corner cover, and the vehicle-exterior surfaces of the outer cover lip projecting from an end of the outer side wall so that no difference in luster between the extruded sections and the molded section is generated, thereby improving the external appearance of the glass run, and the sliding resistance can be reduced when the door glass is raised and lowered.

According to a tenth aspect of the present invention, the glass run is held with the door frame and a door molding attached to the door frame.

With the arrangement of the tenth aspect of the present invention, the glass run is held with the door frame and the door molding attached to the door frame so that the construction of the door frame can be made compact, thereby reducing the weight therereof, and the appearance can be improved by virtue of the door molding.

According to an eleventh aspect of the present invention, the straight sections are formed of one of an EPDM rubber and a thermoplastic olefin elastomer, and the corner sections are formed of a thermoplastic olefin elastomer.

With the arrangement of the eleventh aspect of the present invention, the straight sections of the glass run are formed of one of an EPDM rubber and a thermoplastic olefin elastomer, whereas the corner sections of the glass run are formed of a thermoplastic olefin elastomer. Therefore, the straight sections of the glass run exhibit good weather resistance, whereas the corner sections of the glass run are not required to be vulcanized so as to be readily molded, and exhibit good flexibility. In addition, the straight sections and the corner sections of the glass run are made of similar olefin-based materials so as to obtain the glass run capable of exhibiting good adhesion characteristics and good weather resistance, and being readily recycled.

According to the present invention, a corner cover engaging wall is formed in a vehicle-interior surface of the corner cover lip so as to protrude inwardly therefrom, thereby defining an engaging groove with the corner cover lip and the corner cover engaging wall. With this arrangement, the end of the corner piece is engaged in the engaging groove so that the end edge of the corner cover can be prevented from coming off the corner piece.

A plurality of corner cover inclination ribs are provided so as to respectively have an inclined surface connecting a protruding end of the corner cover engaging wall and a vehicle-interior surface of a root of the corner cover lip. With this arrangement, when the glass run is attached to the door frame after attaching the corner piece to the door frame, the end of the corner piece can slide on the inclined surfaces of the corner cover inclination ribs, and consequently, the end of the corner cover is prevented from being caught with the end of the corner piece, thereby ensuring the smooth attachment of the glass run.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

One embodiment of the present invention will be explained with reference to FIG. 1, FIGS. 5 through 9. FIG. 1 is a side view of a motor vehicle. As shown, a door frame 12 is provided in an upper part of a door 14, and a door glass 16 is attached to the door frame 12 so as to be raised and lowered therealong. Namely, the door glass 16 and a glass run 80 are provided in a door glass opening defined with an inner periphery of the door frame 12, and the glass run 80 guides the door glass 16 as it is raised and lowered, and effects a seal between the door glass 16 and the door frame 12.

The glass run 80 includes straight sections 82 formed generally straight by extrusion, and corner sections 84 adapted to be attached to the corner parts 48 of the door frame 12 and formed by molding to join the extruded straight sections 82 to each other.

The extruded straight sections 82 are attached to an upper side, a rear vertical side, and a front vertical side of the door frame 12.

On the front side of the door 14, the upper side of the door frame 12 extends frontwards and obliquely downwards, and makes an obtuse angle with the front vertical side of the door frame 12. A door molding 86 (FIGS. 5 through 7) is attached to the door frame 12 to define a channel 18 having a generally U-shaped cross-section, in which the glass run 80 is mounted.

In order to conform these extruded straight sections 82 to the door frame 12, they are joined to each other by molding to form the corner sections 84. The corner sections 84 of the glass run 80 are attached to the corner parts 48 of the door frame 12.

Hereinafter, the present embodiment will be explained based on the corner section 84 adapted to be attached to a front corner of a rear door 14. The present invention can be also applied to the corner section adapted to be attached to a rear corner of a front door 14.

Figure 5:
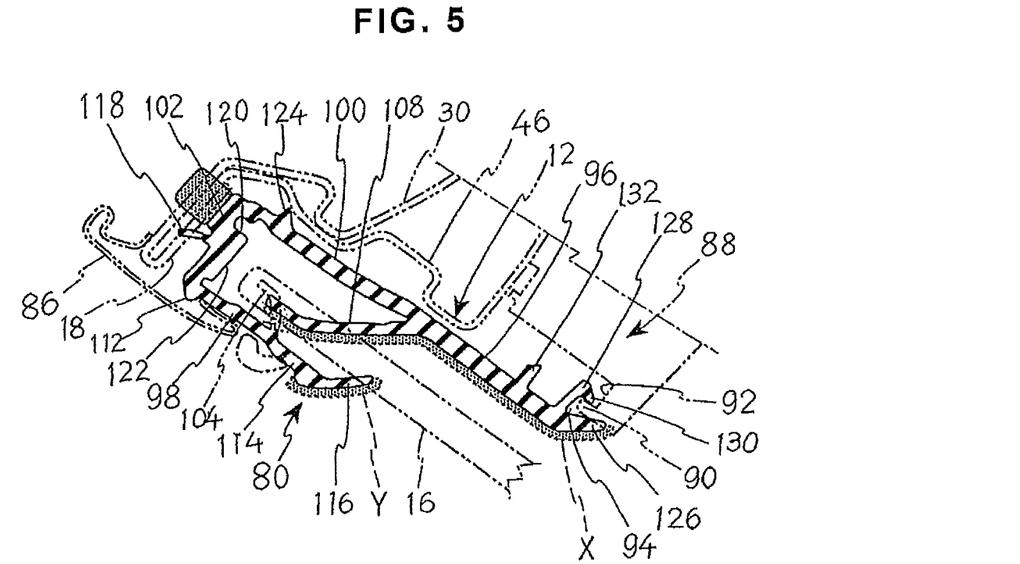
FIG. 5 is a cross-sectional view of a corner section in a joint of a glass run in one embodiment of the present invention, which is taken along line A-A of FIG. 8.
Figure 6:
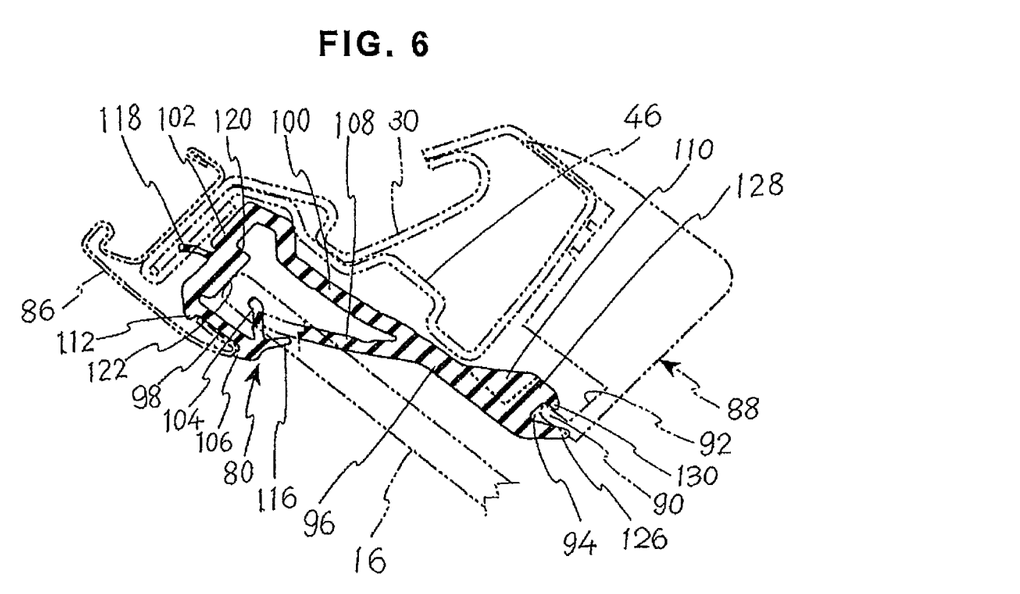
FIG. 6 is a cross-sectional view of a corner section in a joint of a glass run in one embodiment of the present invention, which is taken along line B-B of FIG. 8.
Figure 7:
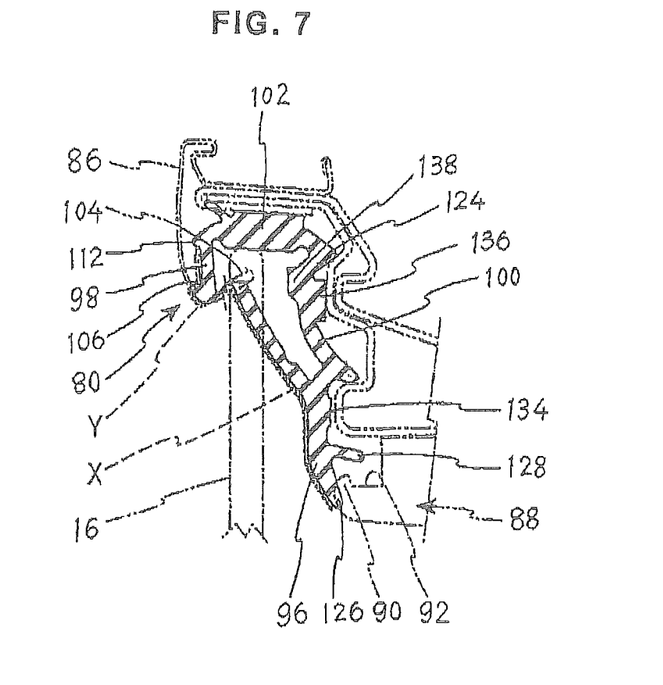
FIG. 7 is a cross-sectional view of a corner section in a joint of a glass run in one embodiment of the present invention, which is taken along line C-C of FIG. 8.

As shown in FIGS. 5 through 7, a corner piece 88 is attached to the vehicle-interior side of the corner part 48 of the door frame 12.

The corner piece 88 is formed to have a generally triangular configuration conforming to the configuration of the corner part 48 of the door frame 12, and two oblique sides thereof are respectively attached to the upper side and the vertical side of the door frame 12. The bottom side of the corner piece 88 is formed to have an arcuate configuration depressed towards its top. An engaging projection 90 bending like a hook is provided along an arcuate end edge of the corner piece 88, and a recess 92 is provided on a rear side (vehicle-interior side) of the engaging projection 90. The engaging projection 90 is adapted to be engaged in an engaging groove 94 provided in a later-described corner cover 96.

As shown in FIGS. 5 through 7, the glass run 80 is attached in the channel 18 defined with an L-shaped portion of the door frame 12, which is provided by joining end parts of the outer panel 46 and the inner panel 30, and the door molding 86 attached to end parts of the outer panel 46 and the inner panel 30.

Figure 8:
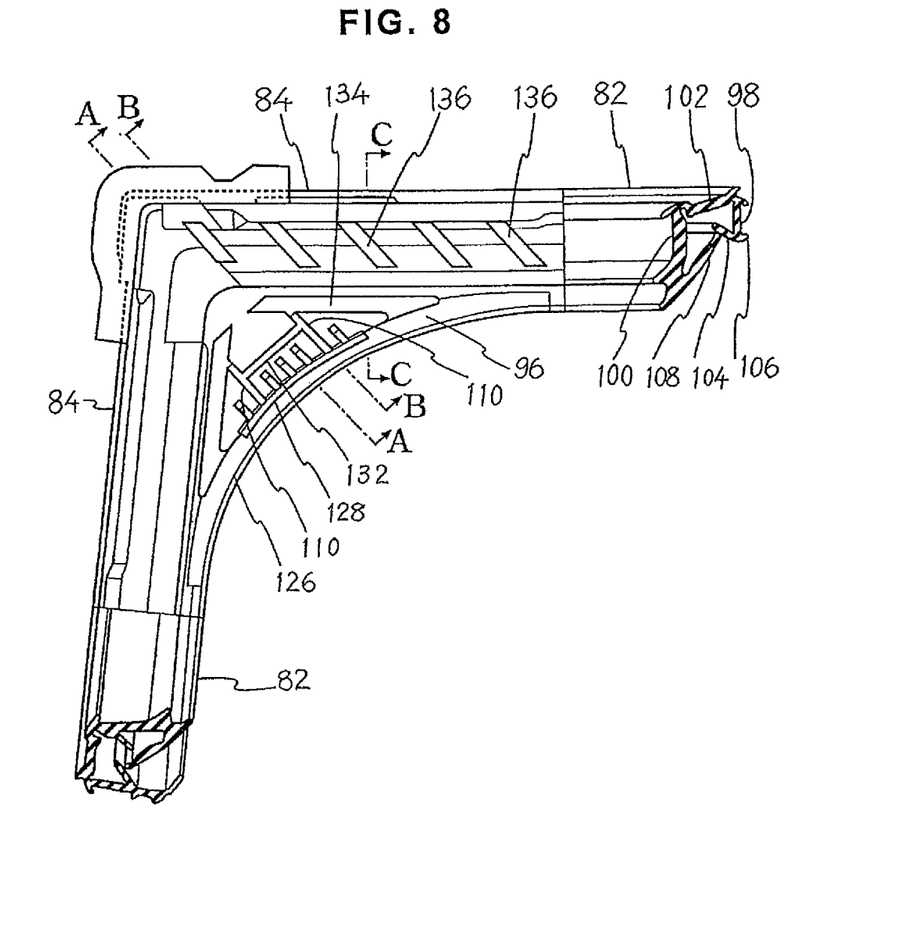
FIG. 8 is a rear view of a corner section of a glass run in one embodiment of the present invention.

As shown in FIG. 8, the straight section 82 of the glass run 80, which is adapted to be attached to the upper side of the door frame 12, has a generally U-shaped cross-section defined with an outer side wall 98, an inner side wall 100 and a bottom wall 102.

The glass run 80 has a substantially identical U-shaped cross-section in both the straight section adapted to be attached to the upper side of the door frame 12 and the straight sections adapted to be attached to the vertical sides thereof.

An outer seal lip 104 extends from an open end of the outer side wall 98 in an interior space of the glass run 80. And an outer cover lip 106 extends from the open end of the outer side wall 98 so as to cover an outer side edge of the door frame 12 defining the channel 18. An inner seal lip 108 extends from an open end of the inner side wall 100 in an interior space of the glass run 80. The outer seal lip 104 and the inner seal lip 108 seal an upper edge of the door glass 16 raised to its closing position.

Hereinafter, the corner section 84 of the glass run 80 will be explained.

As shown in FIG. 1, in the rear corner part 48 of the door frame 12 of the door 14, the upper side thereof is formed to extend in a generally horizontal direction, whereas the vertical side thereof is formed to extend in a direction slightly inclined rearwardly. The upper side and the vertical side of the door frame 12 are abutted on and joined to each other to make an acute angle therebetween. And, as shown in FIGS. 5 through 7, the corner piece 88 is attached to the corner part 48 of the door frame 12. In addition, the door molding 86 is attached to the door frame 12 to hold the glass run 80 along with the door frame 12.

Figure 9:
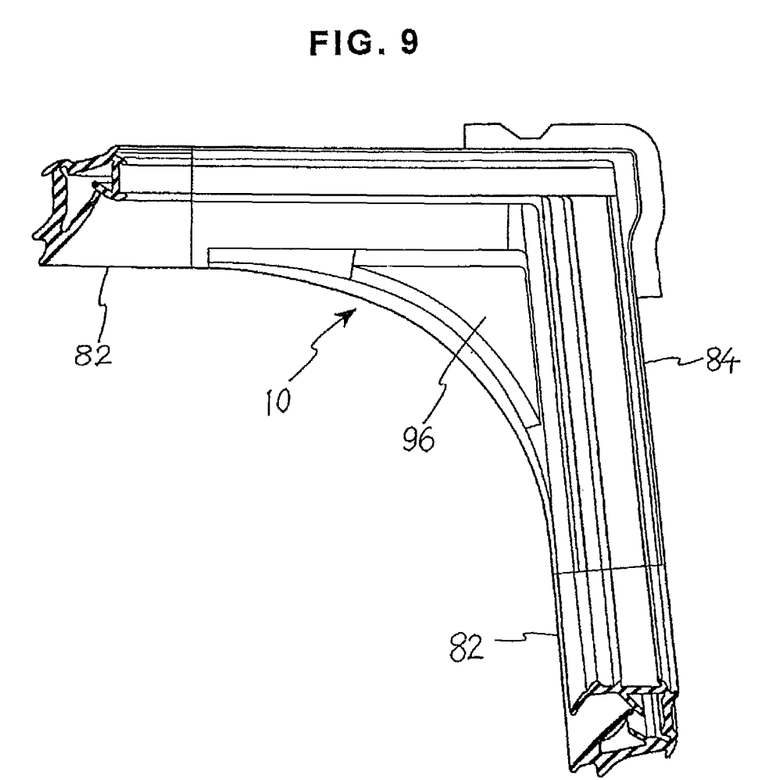
FIG. 9 is a front view of a corner section of a glass run in one embodiment of the present invention.

As shown in FIGS. 8 and 9, the corner section 84 of the glass run 80 is formed by molding so as to join the straight sections 82 adapted to be attached to the upper side and the vertical side of the door frame 12, to each other in conformity with the corner part 48 of the door frame 12. The corner section 84 joins the straight sections 82 for attachment to the upper side and the vertical side of the door frame 12 with heat generated upon molding.

The cross-sectional shapes of the corner section 84 of the glass run 80 are shown in FIGS. 5 through 7. FIG. 5 is a cross-sectional view along a center of the corner section 84, taken along line A-A of FIG. 8, FIG. 6 is a cross-sectional view along a later-described corner cover inclination rib 110 provided in the corner section 84, taken along line B-B of FIG. 8, and FIG. 7 is a cross-sectional view of the corner section 84, taken along line C-C of FIG. 8.

As shown in FIG. 5, the corner section 84 of the glass run 80 has a U-shaped cross-sectional shape and includes an outer side wall 98, an inner side wall 100 and a bottom wall 102, similarly to the straight section 82. The cross-sectional shapes of the straight sections 82 for attachment to the upper side and the vertical side of the door frame 12 slightly differ from each other, but by gradually varying the cross-sectional shape of the corner section 84, the straight sections 82 with slightly different cross-sectional shapes are joined with the corner section 84.

An outer seal lip 104 extends from an open end of the outer side wall 98 in an interior space of the glass run 80. An outer holding lip 112 is formed on a vehicle-exterior surface of the outer side wall 98 in the vicinity of a joint to the bottom wall 102, and an end of the door molding 86 bending like a hairpin contacts the outer holding lip 112 and the vehicle-exterior surface of the outer side wall 98 to hold the outer side wall 98.

An outer extension wall 114 extends from the open end of the outer side wall 98 in an extension direction thereof, and an outer sub-seal lip 116 is formed so as to project from an extending end of the outer extension wall 114 obliquely towards an opening of the glass run 80 so as to contact the door glass 16. When the door glass 16 is raised, the outer seal lip 104 and the outer sub-seal lip 116 contact a vehicle-exterior surface of the door glass 16 to provide a double seal.

As shown in FIG. 6, in the area in which no outer extension wall is provided, the outer sub-seal lip 116 projects from the open end of the outer side wall 98 near the base of the outer seal lip 104 obliquely towards the opening of the glass run 80 so as to contact the door glass 16. In addition, the outer cover lip 106 extends from the open end of the outer side wall 98 so as to cover a bending outer side edge of the door molding 86.

A bottom lip 118 for contacting the door frame 12 is provided in an exterior surface of the bottom wall 102 to provide a seal between the door frame 12 and the bottom wall 102. A protrusion 120 is provided on the interior side of the bottom wall 102 so as to protrude towards an upper edge of the door glass 16, and an interior surface of the protrusion 120 defines a contacting surface 122. When the door glass 16 is raised to its closing position, the upper edge of the door glass 16 contacts the contacting surface 122, and the protrusion 120 flexes to absorb the shock due to the contacting of the door glass 16. A low friction sliding material can be applied or bonded to the contacting surface 122.

The inner seal lip 108 extends from the open end of the inner side wall 100 in an interior space of the glass run 80. An inner holding lip 124 is formed on an exterior surface of the inner side wall 100 in the vicinity of a joint to the bottom wall 102, and contacts a bending area of the door frame 12 to hold the inner side wall 100.

The inner side wall 100 and the inner seal lip 108 are made great and thick, as compared with the outer side wall 98 and the outer seal lip 104. Therefore, the door glass 16 can be shifted outwardly to reduce a level difference between the door glass 16 and the door frame 12, thereby decreasing generations of air resistance and wind noises, and improving design characteristics around the door frame 12.

In the corner section 84 of the glass run 80, the corner cover 96 is provided to extend from the open end of the inner side wall 100 in an extending direction thereof.

As shown in FIGS. 8 and 9, in the corner section 84, the corner cover 96 has a generally triangular configuration including two sides and a bottom side depressed towards its top like an arcuate configuration, similarly to the corner piece 88. The corner cover 96 thus arranged is formed to cover the corner piece 88.

Therefore, the corner piece 88, and the corner part 48 of the door frame 12 can be covered with a main body of the glass run 80 and the corner cover 96, thereby improving the sealing properties and the appearance of the corner section 84.

As shown in FIGS. 5 through 7, a corner cover lip 126 is formed along an arcuate edge of the corner cover 96, and contacts an arcuate edge of the corner piece 88 so as to cover the same. With this arrangement, the arcuate edge of the corner piece 88 is covered with the corner cover lip 126 on the exterior side thereof, thereby improving the appearance of the corner section 84.

A corner cover engaging wall 128 is provided in the corner cover 96 in the vicinity of a root of the corner cover lip 126 so as to protrude from a vehicle-interior surface thereof inwardly of the vehicle body. And a corner cover engaging projection 130 is formed so as to project from a protruding end of the corner cover engaging wall 128 towards the end of the corner cover lip 126, that is in a direction generally perpendicular to the corner cover engaging wall 128. The corner cover engaging projection 130, the corner cover engaging wall 128, and the corner cover lip 126 define the engaging groove 94 having a U-shaped cross-section in the vehicle-interior surface of the corner cover 96 in the vicinity of the end edge thereof.

The engaging projection 90 provided in the corner piece 88 can be fitted in the engaging groove 94. At this time, the corner cover engaging projection 130 is fitted in the corner piece recess 92 adjacent to the engaging projection 90 of the corner piece 88. Therefore, the engaging groove 94 of the corner cover 96 can be formed to conform to the configuration of the engaging projection 90 so that the engaging projection 90 can be fitted in the engaging groove 94, whereby the end of the corner piece 88 can securely hold the end of the corner cover 96. Consequently, the end of the corner cover 96 can be prevented from coming off the corner piece 88.

As shown in FIGS. 6 and 8, a plurality of corner cover inclination ribs 110 are formed to respectively have an inclined surface connecting the protruding end of the corner cover engaging wall 128 and the vehicle-interior surface of the corner cover lip 126 at a root thereof. In the present embodiment, two corner cover inclination ribs 110 are provided at both ends of the corner cover engaging wall 128. The height of the corner cover inclination rib 110 is equal to that of the corner cover engaging wall 128 in a part adjacent to the corner cover engaging wall 128, and gradually decreases away from the corner cover engaging wall 128. And in the vicinity of a lower end of the corner cover inclination rib 110, the height thereof becomes equal to that of the vehicle-interior surface of the corner cover lip 126.

In the present embodiment, two corner cover inclination ribs 110 are provided, but three or more corner cover inclination ribs 110 may be provided.

The corner cover inclination ribs 110 can prevent the tilting of the corner cover engaging wall 128 so that when the glass run 80 is attached to the door frame 12 after attaching the corner piece 88, the inclined surface of the corner cover inclination ribs 110 can smoothly slide on an end of the engaging projection 90 of the corner piece 88, and consequently, an end of the corner cover 96 is prevented from being caught with the engaging projection 90 of the corner piece 88, thereby ensuring the smooth attachment of the glass run 80.

In addition, a corner cover holding rib 132 is provided in the corner cover 96 so as to connect the corner cover inclination ribs 110 in approximately parallel with the corner cover engaging wall 128. With this arrangement, the corner cover holding rib 132 can prevent the tilting of the corner cover inclination ribs 110 so that the end of the engaging projection 90 of the corner piece 88 can smoothly slide on the inclined surfaces of the corner cover inclination ribs 110.

It is preferable to form the corner cover engaging wall 128 and the corner cover inclination ribs 110 in at least a rear corner part of the door frame 12 of the front door and a front corner part of the door frame 12 of the rear door. In this case, even when the angle of the corner part is acute, the glass run 80 can be securely attached to the corner part, and the corner part can be covered with the corner cover 96 of the glass run 80, thereby improving the appearance around the corner part of the door frame 12.

As shown in FIG. 7, a protrusion 134 can be provided in the vehicle-interior surface of the corner cover 96, which is adapted to face the door frame 12, so as to contact the door frame 12. In this case, the protrusion 134 along with a protrusion provided in the door frame 12 seal a gap between the corner cover 96 and the door frame 12, thereby preventing the corner cover 96 from vibrating due to the running, etc. of the motor vehicle.

A protrusion 136 can be provided in the vehicle-interior surface of the inner side wall 100, which is adapted to face the door frame 12, so as to contact a protrusion of the door frame 12. In this case, even when the upper edge of the door glass 16 shifts inwardly, the protrusion 136 prevents the inner side wall 100 from shifting inwardly, and consequently, the main body of the glass run 80 can be prevented from shifting inwardly.

A protrusion 138 can be provided in the surface of the inner side wall 100, which is adapted to face the outer side wall 98, so as to contact the door glass 16. In this case, even when the door glass 16 shifts inwardly, the door glass 16 contacts the protrusion 138 of inner side wall 100 to prevent the door glass 16 from excessively shifting inwardly, thereby ensuring the sealing properties, and from closely contacting the inner side wall 100, thereby preventing the increment of the sliding resistance and the generation of noises when the door glass 16 is raised and lowered.

As shown in FIGS. 5 and 7, it is preferable to form embossment in vehicle-exterior surfaces of the inner seal lip 108 and the corner cover 96 in the area designated X, and in a vehicle-exterior surface of the outer sub-seal lip 116 projecting from the open end of the outer side wall 98 in the area designated Y. With this arrangement, no difference in luster between the extruded straight sections 82 and the molded corner section 84 is generated, thereby improving the external appearance of the glass run 80, and the sliding resistance can be reduced when the door glass is raised and lowered In order to form the glass run 80, the straight sections 82 and the corner sections 84 are formed of synthetic rubber, a thermoplastic elastomer, or a soft synthetic resin. Examples of the synthetic rubber include EPDM rubber, examples of the thermoplastic elastomer include an olefin elastomer, and examples of the soft synthetic resin include a soft vinyl chloride.

Where EPDM rubber and olefin elastomer, which are materials of the same kind, are used, they can be readily recycled.

The straight sections 82 are formed straight with an extruder.

Where the synthetic rubber is used, it is conveyed into a vulcanizing chamber after extrusion, and heated with hot air, high frequency wave, etc. for vulcanization. Where the thermoplastic elastomer and the soft synthetic resin are used, they are cooled for solidifying. Then, the resultant material is cut to obtain extruded members, each having a predetermined length.

Next, the molded sections for forming the corner sections 84 are formed by cutting the thus obtained extruded members adapted to form the straight sections 82 to predetermined dimensions, placing cut ends of the extruded members in a mold, and injecting a material for the molded members in a cavity of the mold. The molded corner section has a generally identical cross-section to that of each of the extruded members. It is preferable that the material for the molded corner section is of the same kind as the material for the extruded members. Where the thermoplastic elastomer and the soft synthetic resin are used, the material is in a molten state when injected into the mold so that the molded section is integrally welded to the extruded members with heat and pressure thereof.

Where the synthetic rubber is used, it is injected to a mold, and then the mold is heated for vulcanization. At this time, the extruded members and the molded sections can be welded through vulcanization using the identical material or the same kind of materials so as to be integrally fixed to each other. Where the extruded members are formed of synthetic rubber, the molded sections can be formed of a thermoplastic elastomer, too.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, which is adapted to be attached along an inner periphery of a door frame of a vehicle door for guiding a door glass as said door glass is raised and lowered, and includes straight sections formed by extrusion, and corner sections formed by molding for contacting corner pieces attached to corner parts of the door frame, comprising:

an outer side wall, an inner side wall and a bottom wall, which define a generally U-shaped cross-section, an outer seal lip and an inner seal lip respectively projecting from open ends of said outer side wall and said inner side wall in an interior space defined with said walls having a generally U-shaped cross-section, thereby sealing exterior and interior surfaces of an end edge of the door glass, a corner cover being provided in the corner sections of the glass run so as to extend from said open end of said inner side wall in an extending direction thereof for covering a vehicle-exterior surface of the corner piece in an arcuate configuration, an arcuate end edge of said corner cover defining a corner cover lip for contacting an end of the corner piece, a corner cover engaging wall protruding inwardly from a vehicle-interior surface of said corner cover lip to define an engaging groove with an end of said corner cover lip and a surface of said corner cover engaging wall, which faces said end of said corner cover lip, and a plurality of corner cover inclination ribs being provided so as to respectively have an inclined surface connecting a protruding end of said corner cover engaging wall and said vehicle-interior surface of said corner cover lip at a root thereof.

2. The glass run according to claim 1, further comprising a corner cover holding rib for connecting said corner cover inclination ribs in approximately parallel with said corner cover engaging wall at a root of said corner cover lip.

3. The glass run according to claim 1, wherein said arcuate end edge of said corner cover lip of said corner cover approximately abuts on an arcuate end edge of the corner piece attached the corner parts of the door frame, and a corner piece engaging projection provided along the end edge of the corner piece is engaged in said engaging groove of said corner cover when said glass run and the corner piece are attached to the door frame.

4. The glass run according to claim 1, further comprising a corner cover engaging projection projecting from said protruding end of said corner cover engaging wall towards an end of said corner cover lip such that said corner cover engaging projection, said corner cover engaging wall and said vehicle-interior surface of said corner cover lip define said corner cover engaging groove.

5. The glass run according to claim 1, wherein said corner cover engaging wall and said plurality of corner cover inclination ribs are provided in a rear corner part of the door frame of a front door of the motor vehicle, and a front corner part of the door frame of a rear door of the motor vehicle.

6. The glass run according to claim 1, further comprising a corner cover protrusion provided in said vehicle-interior surface of said corner cover so as to be adapted to contact the door frame.

7. The glass run according to claim 1, further comprising a door frame protrusion provided in said vehicle-interior surface of said inner side wall so as to be adapted to contact the door frame.

8. The glass run according to claim 1, further comprising a door glass protrusion provided in a surface of said inner side wall, which faces said outer side wall so as to contact the door glass.

9. The glass run according to claim 1, wherein embossment is formed on vehicle-exterior surfaces of said inner seal lip and said corner cover, and vehicle-exterior surfaces of said outer cover lip projecting from an end of said outer side wall.

10. The glass run according to claim 1, wherein said glass run is held with the door frame and a door molding attached to the door frame.

11. The glass run according to claim 1, wherein straight sections of said glass run are formed of one of an EPDM rubber and a thermoplastic olefin elastomer, and corner sections of said glass run are formed of a thermoplastic olefin elastomer.

* * * * *